Aug. 19, 1958    J. BJORKSTEN    2,848,389
WATER PURIFIER
Filed July 21, 1955

INVENTOR.
JOHAN BJORKSTEN
BY
Attorney

2,848,389

WATER PURIFIER

Johan Bjorksten, Fitchburg, Wis.

Application July 21, 1955, Serial No. 523,428

1 Claim. (Cl. 202—234)

This invention relates to methods for utilizing solar energy, and it also relates to methods for preparing potable water from salt water such as sea water.

Heretofore many procedures have been suggested for this purpose, including various solar power actuated water distilling devices. These devices of prior art, however, have the disadvantage of inherently costly construction, high maintenance and insulation costs.

An object of the present invention is a solar power operated heat differential still, which can be made continuously, from extrudable plastic or other materials, in unlimited lengths. Due to the longitudinal extension of this distillation device, which for most applications will be measured in miles, a large total output can be obtained in spite of relatively low output per unit area.

Further objects will become apparent from the drawings and the following detailed description which is given to illustrate the applicability of the invention and not to limit its scope. In the figures, like reference numerals refer to like parts and:

Figure 1:
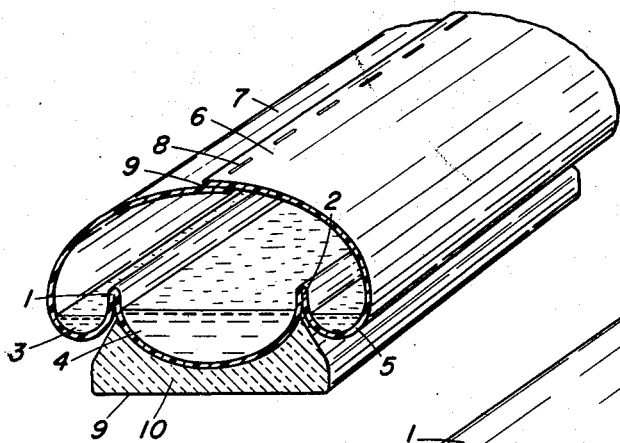
Figure 1 is a partially cross-sectional perspective view of one embodiment.

Referring now to Figure 1, the device comprises a tube of inherently unlimited length. The tube is longitudinally divided by partitions 1 and 2 which extend upwardly, but not completely, to the top of the tube and which provide three receptacles 3, 4, and 5 parallel to each other and a space above the receptacles which communicates with each of them.

Transparent sheet 6 overlaps transparent sheet 7, being fastened together by staples 8, and both sheets in combination providing a cover for the receptacles 3, 4 and 5. The above said tube can be mounted upon a hollow support 9 which is filled with insulating material 10.

In using the invention, receptacle 4 is filled with saline water. The device is placed in the sunlight which penetrates the transparent sheets 6 and 7 to heat the saline water. As a result, the water evaporates into the space above the receptacles 3, 4 and 5, but condenses upon the inner surface of the transparent sheets 6 and 7. The curved structure of the transparent walls 6 and 7 permits the condensed water vapor to trickle down the walls into receptacles 5 and 3 where it can be drawn off through a drainage opening or openings (not shown). The still can be cemented upon a support 9 filled with insulation material 10.

The invention employs a simple distillation process wherein the impurities and salt in the saline water are left in receptacle 4 while pure water evaporates by means of solar heat and condenses upon the inside of the walls 6 and 7. The process is facilitated by a temperature differential which exists between either one of the walls surrounding the receptacles 3 and 5 and the salt water receptacle 4 and the opposite wall which is heated by solar heat.

The temperature differential is caused by two factors: (1) the position of the sun and (2) the evaporation process. For example, the sun heats transparent wall 6 first; transparent wall 7 is relatively shady and cool. Since evaporation is generally a process wherein heat is taken in, the inner surface of walls 6 and 7 will also be cooled. Therefore, water evaporates from the channel 4 and condenses upon the cool, inner surface of the transparent walls.

The device devoid of the support and insulation illustrated in Figure 1 is constructed from a single flat sheet of suitable material which is molded into the desired shape. The free ends of the sheet are allowed to overlap and can be stapled together along the length of the tube to form the cover for the apparatus.

Figure 2:
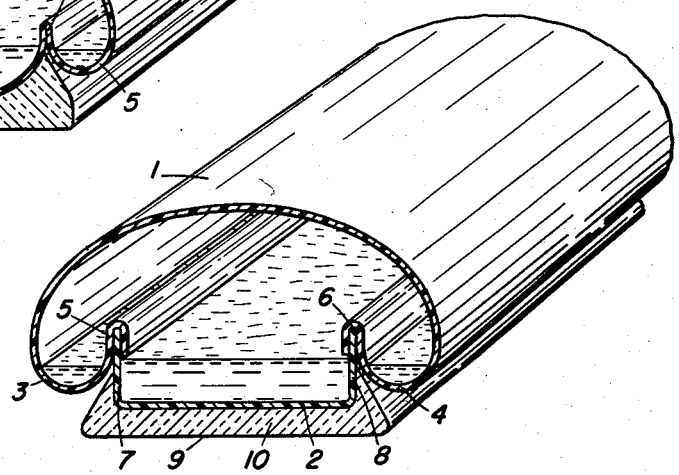
Figure 2 is a partially cross-sectional perspective view of a similar embodiment.

Figure 2 shows a different embodiment of the invention. Essentially, this embodiment differs from the first in the construction method. The device of Figure 2 is made in two parts: the cover 32 and the channel 14. Here the free ends do not overlap, but are molded to form the distilled water receptacles 13 and 15 and rounded loops 21 and 22. The upwardly extended walls 11 and 12 of channel 14 may be cemented into the space provided by the loops 21 and 22. The cover 32 in combination with the channel 14 may be mounted, cemented or riveted upon the hollow support 19 which is filled with insulating material 20.

Figure 3:
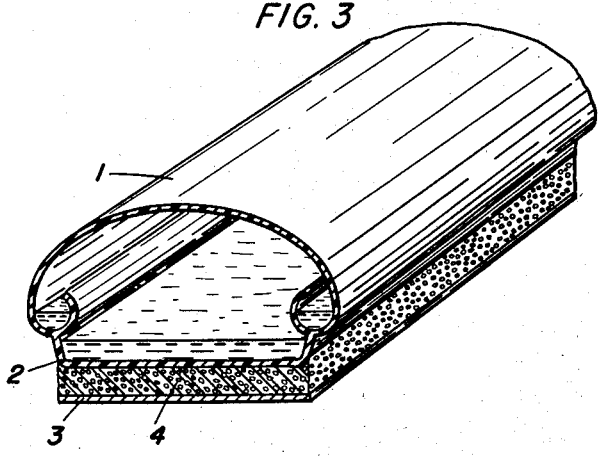
Figure 3 is a partially cross-sectional perspective view of an embodiment adapted to be produced by extrusion.

Figure 3 shows still another embodiment of the invention. The apparatus differs from the first two devices in the construction method. The still illustrated here is extruded: the channel 50 and the cover 42 consist of one continuous piece. A base sheet 51 upon which a plastic may be foamed to form insulation 60 and upon which the extruded still can be mounted provides a support.

As a suitable construction material for the transparent walls cellulose acetate, cellulose acetate butyrate, acrylonitrile, and any acrylic plastic such as methyl methacrylate, methyl acrylate, phenyl methacrylate, polybutyl acrylate, and the like can be used. These plastics are able to withstand ultraviolet light and can be obtained in sufficiently rigid form so that framework is not needed.

The support may be made of any material or plastic which resists distortion by a moderate amount of heat and which is rigid. In this case the plastic need not be transparent. Such synthetic resins as polystyrene, polyvinylidene chloride, butadienestyrene copolymers, polyacrylonitrile, polyethylene terephthalate, polyesters, polychlorotrifluoroethylene, and the like may be used. Wood may also be employed.

The insulating material may be made of foamed polystyrene, cellulose acetate, phenolic resins and other foamable resins. Spun glass, rock wool or aluminum foil may also be used. The insulation prevents heat transfer from the saline water channel to the ground or any material upon which the still may be resting.

Because the construction materials may be riveted, stapled, glued, cemented or laminated, any one of or combination of these methods can be used to fasten the device together.

It can be pointed out that the solar still of this invention does not employ a wick. The saline water can be fed directly into the channel by means of a pump or periodic refilling.

It is thus seen that the invention is broad in scope, and it not to be restricted excepting by the claim, in which it is my intention to cover all novelty inherent in this invention as broadly as possible, in view of prior art. Having thus disclosed my invention, I claim:

A solar still comprising an elongated sheet of substantially rigid organic synthetic resinous polymeric material having each of its edges bent upwardly to provide a channel to contain saline water, and, an elongated sheet of substantially rigid transparent organic synthetic resinous polymeric material disposed above said member, and bent downwardly between the axis thereof and the edges thereof to provide a roof over said first member, said edges bent inwardly and upwardly to provide channels adjacent the edges thereof to receive fresh water and further bent adjacent said channels to provide grooves adapted to receive the edges of said first member, said edges of said first member being seated in said groove.

References Cited in the file of this patent

UNITED STATES PATENTS

| | | |
|---|---|---|
| 2,413,101 | Delano | Dec. 24, 1946 |
| 2,455,835 | Ushakoff | Dec. 7, 1948 |

OTHER REFERENCES

Second Annual Report of the Secretary of the Interior on Saline Water Conversion, January 1954, pages 31, 32 and 35.